United States Patent [19]

Heikel

[11] 4,116,710
[45] Sep. 26, 1978

[54] METALLIC PARTICULATE

[75] Inventor: Henrik R. Heikel, Midland, Mich.

[73] Assignee: The Dow Chemical Company, Midland, Mich.

[21] Appl. No.: 547,146

[22] Filed: Feb. 5, 1975

Related U.S. Application Data

[60] Division of Ser. No. 409,356, Oct. 24, 1973, abandoned, which is a continuation-in-part of Ser. No. 315,170, Dec. 14, 1972, abandoned.

[51] Int. Cl.$^2$ .............................................. C04B 31/18
[52] U.S. Cl. .................................. 106/290; 75/0.5 A; 75/0.5 R; 106/23; 106/26; 106/193 M; 260/37 M; 260/42.22; 313/113
[58] Field of Search ......... 75/0.5 A, 0.5 AA, 0.5 AB, 75/0.5 BA, 0.5 B, 0.5 BB, 0.5 R; 106/290, 23, 26, 193 M; 260/37 M, 42.22; 313/113

[56] References Cited

U.S. PATENT DOCUMENTS

| | | | |
|---|---|---|---|
| 2,839,378 | 6/1958 | McAdow | 106/290 |
| 2,880,181 | 3/1959 | Williams | 260/42.22 |
| 2,941,894 | 6/1960 | McAdow | 106/290 |
| 3,151,971 | 10/1964 | Clough | 75/68 R |
| 3,167,525 | 1/1965 | Thomas | 260/42.22 |
| 3,180,835 | 4/1965 | Peri | 260/42.22 |
| 3,228,882 | 1/1966 | Harle et al. | 260/42.22 |
| 3,281,620 | 10/1966 | Miller | 313/113 |
| 3,371,062 | 2/1968 | Curry | 260/42.22 |
| 3,691,130 | 9/1972 | Loguinenko | 260/42.22 |
| 3,692,731 | 9/1972 | McAdow | 106/290 |
| 3,697,070 | 10/1972 | McAdow | 106/291 |
| 3,713,870 | 1/1973 | Kaye | 117/71 R |
| 3,775,352 | 11/1973 | Leonard | 260/42.22 |
| 3,932,780 | 1/1976 | DeCaro et al. | 313/113 |

*Primary Examiner*—L. Dewayne Rutledge
*Assistant Examiner*—John P. Sheehan
*Attorney, Agent, or Firm*—R. W. Selby; J. M. Kuszaj

[57] ABSTRACT

A method of providing a particulate suitable for use in, for example, coating compositions, such as paints. The described method comprises depositing a metal on a substrate by, for example, electroless or vapor deposition methods. The metal deposit is then removed from substrate to provide a plurality of distinct metal platelets suitable for combination with a carrier and use in a coating composition.

21 Claims, No Drawings

METALLIC PARTICULATE

BACKGROUND OF THE INVENTION

This is a division of application Ser. No. 409,356, filed Oct. 24, 1973, now abandoned, which in turn is a continuation-in-part of application Ser. No. 315,170, filed Dec. 14, 1972, now abandoned.

This invention pertains to a method of producing metal particulate and more in particular relates to a method of forming metal platelets.

It is known that metal powder, such as aluminum, can be admixed with a carrier material and used in a paint; however, the surface of the painted article has generally been found to have a dull, gray appearance. To obtain a lustrous, generally metallic appearing surface on a substrate, such as a light reflector, a metallic plate is usually applied to the substrate by means of a vapor deposition process.

It is desired to obtain a metallic particulate suitable for, for example, a pigment in a coating composition. Desirably the metallic pigment will form a metallic appearing surface on varied substrates by use of a composition appliable by means such as spraying, brushing, dipping, rolling and the like. The coating composition desirably should be capable of being expeditiously applied to more complex configurations more economically than by vapor deposition.

SUMMARY OF THE INVENTION

A method has been developed to produce a metallic particulate which comprises providing a substrate and depositing a metal coating on at least a portion thereof. The coating is subsequently removed from at least a portion of the substrate by appropriate means to thereby provide a plurality of generally separated metal platelets of a generally irregular shape. The metal platelets which generally have a largest dimension, i.e. the length or width, of up to about 5000 microns, are suitable for use as, for example, a pigment in coating compositions or an additive to plastics.

DESCRIPTION OF THE PREFERRED EMBODIMENTS

The disclosed method preferably comprises providing a solid substrate which is soluble in a solvent in which a metal deposited thereon is substantially insoluble. At least a portion of the substrate is contacted and plated with the metal or an alloy thereof by means suitable to form a plurality of metal platelets or flakes upon separation of the metal plate from the substrate. The metal is desirably deposited on the substrate surface to form a metallic coating or plate; however, deposition of metal flakes within the substrate body is within the scope of the instant invention. Suitable means of metal deposition include vapor (including vacuum), electroless and sputter processes known to those skilled in the art; see, for example, U.S. Pat. No. Re. 27,606 which describes the plating of a substrate from an aluminum hydride.

The metal flakes have at least one and preferably two substantially planar surfaces and an irregular periphery. The thickness of such flakes is preferably up to about 1000 angstroms, more preferably at least about 200 angstroms and even more preferably from about 350 to about 600 angstroms. Thicker flakes can be employed; however, the visual appearance of the final coating will not be materially improved over a coating containing thinner flakes within the hereindescribed preferred thickness range. Preferably the largest dimension, i.e., the length or width, of each metal flake is up to about 1200 microns. When the flakes are to be added to or admixed with plastics for, for example, molding or coatings, such as brushable, rollable or dipable paints, the largest dimension is preferably from at least about 100 to about 1000 microns. Flakes for a sprayable coating preferably have an average largest dimension within the range of about 100 to about 200 microns. At least one surface of such flake is characterized as visually having a high luster or shine. In a preferred embodiment, at least one surface of the flake has a specular or mirror-like, reflective appearance.

Generally, all metals which can be deposited onto a substrate by vapor, electroless or sputter deposition are suitable for use in the instant process. Examples of such metals are Mg, Al, Sc, Ti, V, Cr, Mn, Fe, Co, Ni, Cu, Zn, Ga, In, Cd, Ag, Pd, Rh, Ru, Mo, Nb, Zr, Y, La, Hf, Ta, W, Re, Os, Ir, Pt, Au, Tl and Pb. The metal deposited is preferably Mg, Al, Cu, Au and Ag. Most preferably aluminum is deposited. As used herein the term "metal" includes the stipulated base metal and alloys thereof containing greater than 50 weight percent of the base metal.

After deposition of the metal onto a substrate, such as an organic, metallic or other inorganic shape, film, sheet, and the like, the metal is removed by for example, ultrasonic means or preferably dissolving the substrate in a solvent. Suitable solvents are those which remove or dissolve the substrate from the metal coating without dissolving excessive quantities of the metal. Particulate formation by ultrasonic means is taught in copending application bearing attorney's docket number C-16,941, filed by C. B. Roberts, entitled "Metal Particulate Production."

When the metal flakes are to be applied to a surface as a reflective layer, additional solvent is generally employed to remove substantially all of the remaining substrate from the individual metal flakes following removal of the coating from the substrate. The cleaned metal flakes can be, for example, dried and stored or introduced into a chemically and physically inert, i.e. nonreactive, material until it is desired to use the metal particulate.

If desired to obtain smaller flakes, the flakes can be subjected to a cutting-type shearing force after removal of the coating metal from the substrate. Such shearing force can be readily applied to a slurry of flakes by means of, for example, the common high-speed kitchen blender.

The so-separated metal flakes are beneficially used as, for example, a pigment in paints, printing inks, organic plastics, automotive finishes and the like. A paint is herein defined as a suspension of particulate pigment in a vehicle with, if desired, a binder and/or color pigment. Binders and coloring pigments are well known in the art. The paint can be expeditiously applied to a surface of simple or complex configuration by means such as spraying, brushing, dipping, rolling, and the like. After application to a surface, the paint can be air dried or cured by conventional means and polished, if desired.

It has been found that up to about 10 weight percent and preferably up to about 5 weight percent of aluminum flake in a vehicle or carrier is sufficient for most purposes. The minimum quantity of pigment is that amount effective in producing a desired visual appearance of the final coating. Consequently, the quantity and metals employed in the paint can be varied to economically achieve painted surfaces with differing reflective qualities. For example, a 10 weight percent mixture aluminum flake in toluene or isopropanol has been found to have a paste-like consistency, whereas a 3 weight percent mixture is flowable. Sprayable coating mixtures preferably contain up to about one weight percent of the metal particulate. A mirrorlike secondary surface, i.e. a surface in contact with a substrate such as transparent glass, can be obtained by using as little as from about ¼ to about ¾ weight percent of an aluminum particulate in a suitable carrier. Generally coatings applied by brushing or rolling require a higher viscosity than for spraying. This increased viscosity may be obtained by using a greater quantity of metallic particulate for example, about 1 to about 4 weight percent.

A combination of flakes of various alloys and metals can also be admixed as a pigment to achieve differing surface characteristics. A surface with a shiny metallic finish can be achieved by using as little as about one gram of metal flakes in a carrier to cover up to about 50 square feet of surface. A shiny metalliclike surface can be obtained when as thin a paint layer as about 1000 angstroms thick is applied to a clean substrate. Furthermore, an electrically conductive coating on a substrate can be obtained by employing sufficient pigment.

It is also within the scope of this invention to dissolve the substrate within a solvent suitable for use as at least a portion of the carrier material for the metallic pigment. The pigment containing solvent can then be either added or mixed with the remainder of the paint constituents or used as a paint alone.

The following examples are illustrative of the hereinbefore described method.

EXAMPLE 1

1000 grams of 1.2 mil thick polystyrene was plated with a 450 angstrom thick layer of aluminum by conventional vapor deposition techniques, shredded and then mixed in a container with 9500 grams of toluene. The mixture was agitated and in less than 30 minutes the polystyrene was solubilized by the toluene. The aluminum separated as small specular flakes which settled slowly into a loosely packed sediment occupying about ⅓ of the volume in the container. After about 24 hours the clear toluene-polystyrene mixture was removed from the container by decanting. Any remaining toluene-polystyrene mixture was removed by means of a centrifuge.

The separated aluminum flakes were mixed or washed with toluene to completely remove any polystyrene still adhering to the metal. The yield of aluminum flake was 3.3 grams. Each flake observed visually had a lustrous or reflective appearance and was about 450 angstroms thick.

Sufficient toluene was admixed with about 200 milligrams of the washed aluminum flake to provide a flowable mixture containing 0.8 weight percent aluminum solids. This mixture was then mixed with isopropyl alcohol and a solution of ethylcellulose binder and isopropyl alcohol to provide a coating composition with 0.4 weight percent aluminum and an aluminum to binder weight ratio of about 1:1.

The so-prepared coating composition was sprayed by conventional equipment onto a smooth, transparent glass surface in an amount sufficient to coat the equivalent of approximately 30 to 40 square feet of glass surface with one gram of aluminum flake. The exposed aluminum coating composition surface had a lustrous, generally metallic appearing surface; however, the coating composition surface in physical contact with the glass, or secondary surface, had an even greater reflectance or mirrorlike surface than the exposed coating surface. When a light with a 5500 angstrom wavelength and a 45° angle of incidence were employed, the reflectance of the secondary surface was 72 percent.

EXAMPLE 2

Aluminum particulate is prepared substantially as described in Example 1 and admixed with a carrier which will not detrimentally affect either the article or surface to be coated. The aluminum flake-carrier, i.e. isopropyl alcohol, mixture is then combined with a binder of a cyclic sulfonium zwitterion monomer (prepared as described in, for example, U.S. Pat. No. 3,636,052) to provide a composition containing about 0.3 weight percent aluminum flake, about 0.3 to 0.5 weight percent binder and the balance isopropyl alcohol. The composition is applied to objects formed of polystyrene, acrylonitrile-butadiene-styrene inter polymers, polycarbonate and acrylic plastics. After conventional curing, the adherent coating has a lustrous, metallic appearing surface.

EXAMPLE 3

Aluminum flake is prepared from a polystyrene film, with a vacuum deposited aluminum plate thereon, substantially as described in Example 1. The flake is stirred into an isopropyl alcohol carrier and an ethylcellulose binder to form a liquid mixture or slurry with aluminum flake substantially uniformly distributed therein. The mixture is first sprayed onto the surface of a polycarbonate film to provide a uniform coating layer and then dried in ambient laboratory air. The reflective coating surface is determined to have an electrical resistance of 200 ohms per square.

EXAMPLE 4

Aluminum flakes were prepared substantially as described in Example 1 and formed into a coating composition containing by weight 0.4 percent aluminum flake, 0.4 percent ethylcellulose, 80 percent isopropyl alcohol and 19.2 percent xylene. The coating composition was sprayed onto a ¼ inch thick plate glass substrate using an aerosol-type applicator to form an adherent, reflective coating.

As a comparison, a similar ¼ inch thick plate glass substrate was spray coated, from an aerosol container, with a commercially available aluminum paint. The paint contained 3.3 percent aluminum paste, 9.7 percent processed fish oil and phenolic resin, 50 percent dichlorodifluoromethane and 37 percent xylene.

After air drying the reflectance of both the aluminum flake containing surface and the comparative aluminum painted surface were compared using visible light and a commercially available Gardner gloss meter. In each reflectance test the meter was standardized to indicate 100 percent for the aluminum flake containing surface. As shown in the following table, the results of the above tests illustrate the superior reflectance obtainable with the aluminum flake containing composition of the present invention.

| Angle of Incidence of the Light (degrees) | Surface | Percent Reflectance | |
|---|---|---|---|
| | | Al Flake Containing Coating | Comparative Al Paint |
| 20 | primary[1] | 100 | 4 |
| 20 | secondary[2] | 100 | 15 |
| 45 | primary | 100 | 27 |

[1] Primary indicates the aluminum containing surface directly exposed to the atmosphere and the test light.
[2] Secondary indicates the aluminum containing surface in physical contact with the glass. The light passed through the glass before being reflected from the secondary surface.

EXAMPLE 5

TRYCITE ® (a trademark of The Dow Chemical Company) plastic film was plated with aluminum as described in U.S. Pat. No. Re. 27,606. The TRYCITE ® plastic film was treated with benzene to remove the aluminum plate and form small aluminum flakes.

EXAMPLE 6

Cellulose acetate film was plated with aluminum as described in U.S. Pat. No. Re. 27,606. The film was solubilized in acetone to produce reflective aluminum flakes.

EXAMPLE 7

Aluminum flakes were formed by dissolving a TRYCITE ® plastic film substrate having a vacuum deposited aluminum coating thereon in a toluene solvent. The resulting mixture was pumped into a centrifuge to remove the liquid phase from the solid aluminum. The solid aluminum flakes were contacted with toluene to remove substantially all of the remaining substrate composition. The majority flakes were determined to have a largest dimension of 300 to 400 microns with a minority having a largest dimension up to 1000 microns.

100 Grams of a slurry of the flakes in toluene (1.056 weight percent aluminum) was admixed with 31.7 grams of diethylbenzene, 48.7 grams of toluene and 30.6 grams of a solution of 30 milligrams/milliliter (mg/ml) of an ethylcellulose resin in toluene. This mixture was subjected to the sharp, rotating blade, of a standard kitchen blender for two minutes. The resulting mixture contained aluminum flakes of a reduced size. The majority of the flakes had a largest dimension of about 100 microns with a minority being within a range of about 10 to 20 microns.

The final aluminum flake containing mixture is suitable for use as a coating composition.

EXAMPLES 8-10

A paint containing 0.41 weight percent of about 350 angstrom thick aluminum flake was prepared by admixing together 50 cubic centimeters (cc) of toluene containing 310 milligrams (mg) of aluminum flake prepared in accord with present invention, 20 cc of toluene and 16 cc of a solution of a 100 centipoise ethylcellulose resin and toluene wherein the resin concentration in the toluene solution was 20 mg/ml of toluene. The aluminum in the paint was then subjected to a cutting, shear-type force to reduce the flake size by means of a kitchen blender.

The paint was sprayed onto an exterior surface of commercially available 25, 100 and 500 watt light bulbs. An adherent coating with a highly reflective secondary surface was obtained. The coatings on the light bulbs were use tested by alternately lighting and deenergizing the light bulbs for 15 minute periods. The coating on the 500 watt bulb began to blister after a test period of 24 hours, whereas, the coatings applied to the 25 and 100 watt bulbs remained in a satisfactory, undamaged condition after being tested for 10 days.

EXAMPLES 11-16

About 450 angstrom thick flakes were produced in accord with the present invention from a substrate with a vapor deposited aluminum layer thereon. A sufficient amount of a toluene 1½ weight percent aluminum flake slurry was added to lacquers colored green, blue and brown (DuPont lacquer Nos. 5171, 5327 and 5425 respectively) to provide a flake concentration of about 0.25 grams of aluminum flake per gallon of final lacquer (gmAl/gal). Flake concentrations of about 0.5 gmAl/gal of green and brown and about 1 gmAl/gal of blue lacquer were also mixed.

Each of the aluminum containing lacquers was sprayed onto a primed 3 inch by 9 inch steel sheet and air dried. The sprayed and dried surfaces were compared to similar sheets sprayed with the same lacquer not having the aluminum flake added thereto. The aluminum flake containing green and brown coated surfaces had very good and the blue surfaces fair visual appearances with a greater metallic luster than the non-flake containing coated surfaces. An adherent flake containing coating, suitable for an automobile surface finish resulted in each test specimen.

EXAMPLES 17-19

Magnesium, gold and silver were deposited by vacuum methods onto separate silicone resin type release agent coatings on MYLAR ® plastic films. The release agents were individually dissolved in toluene to form Mg, Au and Ag platelets and solid MYLAR ® plastic film. The platelets were readily separated from the solid plastic film. The largest platelet dimension of the Mg ranged from 200 to 3000 microns. The size range of the Au ranged from 50 to 600 microns with the majority being within 100 to 250 microns. The Ag platelets had a largest dimension of from 400 to 5000 microns with the majority being within the range of 1000 to 2400 microns.

EXAMPLE 20

Copper platelets with the largest dimension being within the range of 40 to 3000 microns and the majority within the range of 200 to 2000 microns were formed by vacuum depositing copper on TRYCITE ® plastic film and then dissolving the plastic film in toluene.

EXAMPLE 21

Finely divided aluminum platelets were formed by immersing a MYLAR ® plastic film coated with a silicone resin type release agent, a lacquer overcoating and vacuum deposited aluminum on the lacquer surface in toluene and subjecting the immersed plastic film composite to ultrasonic energy for 1 minute.

EXAMPLE 22

Aluminum platelets were formed in accord with the present invention by immersing in toluene a 1 mil thick polystyrene film which had been vacuum coated with aluminum on two surfaces. Shiny aluminum platelets were released as the polystyrene dissolved.

What is claimed is:

1. A method comprising providing a substrate with a coating on at least a portion of the substrate, the coating consisting essentially of an about 200 to about 600 angstrom thick vapor deposited metal layer, dissolving the substrate to separate at least a portion of the coating from the substrate to provide a plurality of generally separate irregularly shaped metal platelets with a largest dimension up to about 5000 microns, and introducing the metal platelets into a carrier suitable for use in a coating composition.

2. The method of claim 1 wherein the metal coating is aluminum.

3. The method of claim 2, including removing substantially all of the substrate material from the platelets before introducing the platelets into a carrier.

4. A composition comprising a carrier suitable for use in a coating composition and metallic particulate formed by providing a substrate with a coating on at least a portion of the substrate, the coating consisting essentially of an about 200 to about 600 angstrom thick vapor deposited metal layer, dissolving the substrate to separate at least a portion of the coating from the substrate to provide a plurality of generally separate irregularly shaped metal platelets with a largest dimension up to about 5000 microns.

5. A composition comprising a carrier for use in a coating composition and metallic particulate formed by providing a substrate with a vapor deposited coating on at least a portion of the substrate, the coating consisting essentially of an about 200 to about 600 angstrom thick aluminum layer, separating at least a portion of the coating from the substrate by dissolving the substrate to provide a plurality of generally separate irregularly shaped aluminum platelets with a largest dimension up to about 5000 microns.

6. The composition of claim 5 containing up to about 10 weight percent of aluminum flakes with thicknesses of from about 200 to about 600 angstroms.

7. The composition of claim 6 containing up to about 5 weight percent aluminum flake.

8. the composition of claim 6 containing from about ¼ to about ¾ weight percent aluminum flake.

9. the composition of claim 8 including a binder.

10. A coating containing the composition of claim 4.

11. A coating containing the composition of claim 6.

12. A coating with a mirror-like secondary surface consisting essentially of a color pigment free mixture of the composition of claim 8 and a binder.

13. The coating of claim 12 wherein the aluminum flakes have an average largest dimension within the range of from about 100 to about 200 microns.

14. The coating of claim 13 containing aluminum flakes previously cleaned to remove substantially all of the original substrate material from the composition.

15. The composition of claim 4 wherein the metal is selected from the group consisting of Mg, Al, Sc, Ti, V, Cr, Mn, Fe, Co, Ni, Cu, Zn, Ga, In, Cd, Ag, Pd, Rh, Ru, Mo, Nb, Zr, Y, La, Hf, Ta, W, Re, Os, Ir, Pt, Au, Tl, and Pb.

16. The composition of claim 4 wherein the metal is selected from the group consisting of Mg, Al, Cu, Au, and Ag.

17. A light bulb with an exterior surface thereof coated with a composition consisting essentially of the composition of claim 16 and a binder, the coating having a reflective surface in contact with the light bulb.

18. A light bulb with an exterior surface thereof coated with a composition consisting essentially of the composition of claim 15 and a binder, the coating having a reflective surface in contact with the light bulb.

19. A light bulb with an exterior surface thereof coated with a composition consisting essentially of the composition of claim 5 and a binder, the coating having a reflective surface in contact with the light bulb.

20. A light bulb with an exterior surface thereof coated with a composition consisting essentially of a color pigment free mixture of the composition of claim 5 and a binder, the coating having a mirror-like surface in contact with the light bulb.

21. A light bulb with a surface thereof coated with a composition consisting essentially of a color pigment free mixture of the composition of claim 8 and a binder, the coating having a mirror-like surface in contact with the light bulb.

* * * * *

UNITED STATES PATENT AND TRADEMARK OFFICE
CERTIFICATE OF CORRECTION

PATENT NO. : 4,116,710
DATED : September 26, 1978
INVENTOR(S) : Henrik R. Heikel It is certified that error appears in the above-identified patent and that said Letters Patent are hereby corrected as shown below:

Column 1, line 27, delete the word "more", first instance.

Column 2, lines 33 through 36, delete "copending application bearing attorney's docket number C-16,941, filed by C. B. Roberts, entitled "Metal Particulate Production." " and insert --U. S. Patent 3,839,012.--.

Column 7, Claim 8, line 42, delete "the" and insert --The--.

Column 8, Claim 9, line 1, delete "the" and insert --The--.

Signed and Sealed this

Thirtieth Day of January 1979

[SEAL]

Attest:

RUTH C. MASON
Attesting Officer

DONALD W. BANNER
Commissioner of Patents and Trademarks